US008357454B2

(12) United States Patent
Kulkarni et al.

(10) Patent No.: US 8,357,454 B2

(45) Date of Patent: *Jan. 22, 2013

(54) SEGMENTED THERMAL BARRIER COATING

(75) Inventors: Anand A. Kulkarni, Oviedo, FL (US); David J. Mitchell, Oviedo, FL (US); Ramesh Subramanian, Oviedo, FL (US); Andrew J. Burns, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1129 days.

This patent is subject to a terminal disclaimer.

(21) Appl. No.: 12/238,939

(22) Filed: Sep. 26, 2008

(65) Prior Publication Data

US 2009/0017260 A1 Jan. 15, 2009

Related U.S. Application Data

(63) Continuation-in-part of application No. 12/101,460, filed on Apr. 11, 2008, now abandoned, and a continuation-in-part of application No. 10/649,536, filed on Aug. 26, 2003, now abandoned, which is a continuation-in-part of application No. 09/921,206, filed on Aug. 2, 2001, now Pat. No. 6,703,137.

(51) Int. Cl.

| | |
|---|---|
| ***B32B 3/00*** | (2006.01) |
| ***B32B 3/26*** | (2006.01) |
| ***B32B 9/00*** | (2006.01) |
| ***B32B 15/04*** | (2006.01) |
| ***B32B 19/00*** | (2006.01) |
| ***B64C 11/16*** | (2006.01) |
| ***F01D 15/04*** | (2006.01) |

(52) U.S. Cl. .................. 428/469; 428/304.4; 428/312.2; 428/316.6; 428/699; 428/701; 428/702; 416/214 B

(58) Field of Classification Search .............. 416/241 B; 428/469, 304.4, 312.2, 316.6, 699, 701, 702

See application file for complete search history.

(56) References Cited

U.S. PATENT DOCUMENTS

T967009 I4 2/1978 Gale (Continued)

FOREIGN PATENT DOCUMENTS

EP 0916744 A2 5/1999

(Continued)

OTHER PUBLICATIONS

Cao et al., "New double-ceramic layer thermal barrier coatings based on zirconia-rare earth composite oxides", Journal of the European Ceramic Society, vol. 26, 2006, pp. 247-251.*

(Continued)

*Primary Examiner* — Jonathan Langman

(57) ABSTRACT

A ceramic thermal barrier coating (TBC) (18) having first and second layers (20, 22), the second layer (22) having a lower thermal conductivity than the first layer for a given density. The second layer may be formed of a material with anisotropic crystal lattice structure. Voids (24) in at least the first layer (20) make the first layer less dense than the second layer. Grooves (28) are formed in the TBC (18) for thermal strain relief. The grooves may align with fluid streamlines over the TBC. Multiple layers (84, 86, 88) may have respective sets of grooves (90), Preferred failure planes parallel to the coating surface (30) may be formed at different depths (A1, A2, A3) in the thickness of the TBC to stimulate generation of a fresh surface when a portion of the coating fails by spalling. A dense top layer (92) may provide environmental and erosion resistance.

9 Claims, 5 Drawing Sheets

U.S. PATENT DOCUMENTS

| | | | |
|---|---|---|---|
| 4,299,860 | A | 11/1981 | Schaefer et al. |
| 4,377,371 | A | 3/1983 | Wisander et al. |
| 4,405,659 | A | 9/1983 | Strangman |
| 4,457,948 | A | 7/1984 | Ruckle et al. |
| 4,537,793 | A | 8/1985 | Kehrer et al. |
| 4,684,780 | A | 8/1987 | Cantello et al. |
| 4,884,820 | A | 12/1989 | Jackson et al. |
| 4,988,538 | A | 1/1991 | Horvei et al. |
| 5,073,433 | A | 12/1991 | Taylor |
| 5,350,599 | A | 9/1994 | Rigney et al. |
| 5,352,540 | A | 10/1994 | Schienle et al. |
| 5,409,741 | A | 4/1995 | Laude |
| 5,426,092 | A | 6/1995 | Ovshinsky et al. |
| 5,441,283 | A | 8/1995 | Pecht et al. |
| 5,558,922 | A | 9/1996 | Gupta et al. |
| 5,562,998 | A | 10/1996 | Strangman |
| 5,576,069 | A | 11/1996 | Chen et al. |
| 5,595,791 | A | 1/1997 | Baumgart et al. |
| 5,652,044 | A | 7/1997 | Rickerby |
| 5,681,616 | A | 10/1997 | Gupta et al. |
| 5,683,825 | A | 11/1997 | Bruce et al. |
| 5,705,231 | A | 1/1998 | Nissley et al. |
| 5,743,013 | A | 4/1998 | Taylor et al. |
| 5,780,171 | A | 7/1998 | Nissley et al. |
| 5,830,586 | A | 11/1998 | Gray et al. |
| 5,951,892 | A | 9/1999 | Wolfla et al. |
| 5,993,976 | A | 11/1999 | Sahoo et al. |
| 6,034,348 | A | 3/2000 | Kim et al. |
| 6,047,539 | A | 4/2000 | Farmer |
| 6,057,047 | A | 5/2000 | Maloney |
| 6,102,656 | A | 8/2000 | Nissley et al. |
| 6,110,604 | A | 8/2000 | Rickerby |
| 6,224,963 | B1 | 5/2001 | Strangman |
| 6,261,643 | B1 * | 7/2001 | Hasz et al. ................. 427/419.1 |
| 6,316,078 | B1 | 11/2001 | Smialek |
| 6,443,813 | B1 | 9/2002 | Strom et al. |
| 6,445,963 | B1 | 9/2002 | Blevins et al. |
| 6,676,878 | B2 | 1/2004 | O'Brien et al. |
| 6,703,137 | B2 * | 3/2004 | Subramanian ................ 428/469 |
| 6,846,574 | B2 | 1/2005 | Subramanian |
| 6,939,603 | B2 | 9/2005 | Oechsner |
| 2001/0037823 | A1 | 11/2001 | Middelman et al. |
| 2002/0110698 | A1 | 8/2002 | Singh |
| 2002/0172837 | A1 | 11/2002 | Allen et al. |
| 2003/0101587 | A1 | 6/2003 | Rigney et al. |
| 2003/0209859 | A1 | 11/2003 | Young et al. |
| 2004/0266615 | A1 | 12/2004 | Watson et al. |
| 2007/0036997 | A1 | 2/2007 | Floyd et al. |

FOREIGN PATENT DOCUMENTS

| | | | |
|---|---|---|---|
| EP | 1283278 | A2 | 2/2003 |
| EP | 1734148 | A1 | 12/2006 |
| JP | 2001144339 | A | 5/2001 |
| SU | 1719756 | A1 | 3/1992 |
| WO | 2007005832 | A2 | 1/2007 |
| WO | 2007116547 | A1 | 10/2007 |
| WO | 2008140479 | A2 | 11/2008 |

OTHER PUBLICATIONS

Haddadi, A. et al Cystalline Growth within Alumina and Zirconia Coatings with Coating Temperature Control during Spraying. Thermal Spray: Practical Solutions for Engineering Problems. C.C. Berndt (ed.). Materials Park, OH: ASM International, 1996, pp. 615-622.

Nerz, John E. Taguchi Analysis of Thick Thermal Barrier Coatings. Thermal Spray Research and Applications, Proceedings of the 3$^{rd}$ National Thermal Spray Conference, Long Beach, CA, May 1990, pp. 669-673.

Johner, G. et al. Experimental and Theoretical Aspects of Thick Thermal Barrier Coatings for Turbine Applications. Proceedings of the National Thermal Spray Conference, Orlando, FL, 1987. Ed. D.L. Houck, 1987, pp. 155-166.

* cited by examiner

SEGMENTED THERMAL BARRIER COATING

CROSS-REFERENCE TO RELATED APPLICATIONS

This application is a continuation-in-part of U.S. patent application Ser. No. 10/649,536 filed Aug. 26, 2003 now abandoned, which is a continuation-in-part of U.S. patent application Ser. No. 09/921,206 filed Aug. 2, 2001, now patent U.S. Pat. No. 6,703,137 issued Mar. 9, 2004. This application is also a continuation-in-part of U.S. patent application Ser. No. 12/101,460 filed Apr. 11, 2008 now abandoned. These parent applications are incorporated herein by reference.

FIELD OF THE INVENTION

This invention relates generally to thermal barrier coatings and in particular to a strain tolerant thermal barrier coating for a gas turbine component and a method of manufacturing the same.

BACKGROUND OF THE INVENTION

It is known that the efficiency of a combustion turbine engine will improve as the firing temperature of the combustion gas is increased. As the firing temperatures increase, the high temperature durability of the components of the turbine must increase correspondingly. Although nickel and cobalt based superalloy materials are now used for components in the hot gas flow path, such as combustor transition pieces and turbine rotating and stationary blades, even these superalloy materials are not capable of surviving long term operation at temperatures sometimes exceeding 1,400 degrees C. In many applications a metal substrate is coated with a ceramic insulating material in order to reduce the service temperature of the underlying metal and to reduce the magnitude of the temperature transients to which the metal is exposed.

Thermal barrier coating (TBC) systems are designed to maximize their adherence to the underlying substrate material and to resist failure when subjected to thermal cycling. The temperature transient that exists across the thickness of a ceramic coating results in differential thermal expansion between the top and bottom portions of the coating. Such differential thermal expansion creates stresses within the coating that can result in the spalling of the coating along one or more planes parallel to the substrate surface. It is known that a more porous coating will generally result in lower stresses than dense coatings. Porous coatings also tend to have improved insulating properties when compared to dense coatings. However, porous coatings will densify during long term operation at high temperature due to diffusion within the ceramic matrix, with such densification being more pronounced in the top (hotter) layer of the coating than in the bottom (cooler) layer proximate the substrate. This difference in densification also creates stresses within the coating that may result in spalling of the coating.

A current state-of-the-art thermal barrier coating is yttria-stabilized zirconia (YSZ) deposited by electron beam physical vapor deposition (EB-PVD). The EB-PVD process provides the YSZ coating with a columnar microstructure having sub-micron sized gaps between adjacent columns of YSZ material, as shown for example in U.S. Pat. No. 5,562,998. The gaps between columns of such coatings provide an improved strain tolerance and resistance to thermal shock damage. Alternatively, the YSZ may be applied by an air plasma spray (APS) process. The cost of applying a coating with an APS process is generally less than one half the cost of using an EB-PVD process. However, it is extremely difficult to form a desirable columnar grain structure with the APS process.

It is known to produce a thermal barrier coating having a surface segmentation to improve the thermal shock properties of the coating. U.S. Pat. No. 4,377,371 discloses a ceramic seal device having benign cracks deliberately introduced into a plasma-sprayed ceramic layer. A continuous wave $CO_2$ laser is used to melt a top layer of the ceramic coating. When the melted layer cools and re-solidifies, a plurality of benign micro-cracks are formed in the surface of the coating as a result of shrinkage during the solidification of the molten regions. The thickness of the melted/re-solidified layer is only about 0.005 inch and the benign cracks have a depth of only a few mils. Accordingly, for applications where the operating temperature will extend damaging temperature transients into the coating to a depth greater than a few mils, this technique offers little benefit.

Special control of the deposition process can provide vertical micro-cracks in a layer of TBC material, as taught by U.S. Pat. Nos. 5,743,013 and 5,780,171. Such special deposition parameters may place undesirable limitations upon the fabrication process for a particular application.

U.S. Pat. No. 4,457,948 teaches that a TBC may be made more strain tolerant by a post-deposition heat treatment/quenching process which will form a fine network of cracks in the coating. This type of process is generally used to treat a complete component and would not be useful in applications where such cracks are desired on only a portion of a component or where the extent of the cracking needs to be varied in different portions of the component.

U.S. Pat. No. 5,558,922 describes a thick thermal barrier coating having grooves formed therein for enhance strain tolerance. The grooves are formed by a liquid jet technique. Such grooves have a width of about 100-500 microns. While such grooves provide improved stress/strain relief under high temperature conditions, they are not suitable for use on airfoil portions of a turbine engine due to the aerodynamic disturbance caused by the flow of the hot combustion gas over such wide grooves. In addition, the grooves go all the way to the bond coat and this can result in its oxidation and consequently lead to premature failure.

U.S. Pat. No. 5,352,540 describes the use of a laser to machine an array of discontinuous grooves into the outer surface of a solid lubricant surface layer, such as zinc oxide, to make the lubricant coating strain tolerant. The grooves are formed by using a carbon dioxide laser and have a surface opening size of 0.005 inch, tapering smaller as they extend inward to a depth of about 0.030 inches. Such grooves would not be useful in an airfoil environment, and moreover, the high aspect ratio of depth-to-surface width could result in an undesirable stress concentration at the tip of the groove in high stress applications.

It is known to use laser energy to cut depressions in a ceramic or metallic coating to form a wear resistant abrasive surface. Such a process is described in U.S. Pat. No. 4,884,820 for forming an improved rotary gas seal surface. A laser is used to melt pits in the surface of the coating, with the edges of the pits forming a hard, sharp surface that is able to abrade an opposed wear surface. Such a surface would be very undesirable for an airfoil surface. Similarly, a seal surface is textured by laser cutting in U.S. Pat. No. 5,951,892. The surface produced with this process is also unsuitable for an airfoil application. These patents are concerned with material wear properties of a wear surface, and as such, do not describe processes that would be useful for producing a TBC having improved thermal endurance properties.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
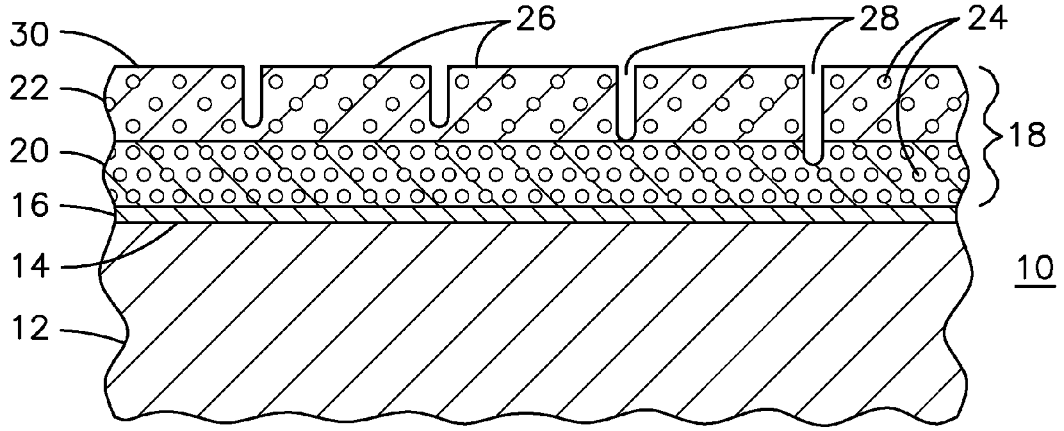
FIG. 1 is a partial cross-sectional view of a combustion turbine blade having a substrate material coated with a thermal barrier coating having two distinct layers of porosity, with the top layer being segmented by a plurality of laser-engraved gaps.

FIG. 1 illustrates a partial cross-sectional view of a component 10 formed to be used in a very high temperature environment. Component 10 may be, for example, the airfoil section of a combustion turbine blade or vane. Component 10 includes a substrate 12 having a top surface 14 that will be exposed to the high temperature environment. For the embodiment of a combustion turbine blade, the substrate 12 may be a superalloy material such as a nickel or cobalt base superalloy, and is typically fabricated by casting and machining. In other embodiments the substrate may be a ceramic matrix composite material or any known structural material. The substrate surface 14 is typically cleaned to remove contamination, such as by aluminum oxide grit blasting, prior to the application of any additional layers of material. A bond coat 16 may be applied to the substrate surface 14 in order to improve the adhesion of a subsequently applied thermal barrier coating and to reduce the oxidation of the underlying substrate 12. Alternatively, the bond coat may be omitted and a thermal barrier coating applied directly onto the substrate surface 14. One common bond coat 16 is an MCrAlY material, where M denotes nickel, cobalt, iron or mixtures thereof, Cr denotes chromium, Al denotes aluminum, and Y denotes yttrium. Another common bond coat 16 is alumina. The bond coat 16 may be applied by any known process, such as sputtering, plasma spray processes, high velocity plasma spray techniques, low or high velocity flame spray techniques, or electron beam physical vapor deposition.

Next, a layer of insulating material such as a ceramic thermal barrier coating 18 is applied over the bond coat 16 or directly onto the substrate surface 14. The thermal barrier coating (TBC) may be a yttria-stabilized zirconia, which includes zirconium oxide $ZrO_2$ with a predetermined concentration of yttrium oxide $Y_2O_3$, pyrochlores, perovskites, mixed oxides of pyrochlores, perovskites or other TBC material known in the art. The TBC may be applied using the less expensive air plasma spray technique, although other known deposition processes may be used. The thermal barrier coating 18 may be formed of the same material throughout its depth in one embodiment. In another embodiment, as illustrated in FIG. 1, the thermal barrier coating includes a first-applied bottom layer 20 and an overlying top layer 22, with at least the density being different between the two layers. Bottom layer 20 has a first density that is less than the density of top layer 22. In one embodiment, bottom layer 20 may have a density that is between 80-95% of the theoretical density of the bottom layer material, and top layer 22 may have a density that is at least 95% of the theoretical density of the top layer material. The theoretical density is a value that is known in the art or that may be determined by known techniques, such as mercury porosimetry or by visual comparison of photomicrographs of materials of known densities. The porosity and density of a layer of TBC material may be controlled with known manufacturing techniques, such as by including small amounts of void-forming materials such as polyester during the deposition process. The bottom layer 20 provides better thermal insulating properties per unit of thickness than does the top layer 22 as a result of the insulating effect of the pores 24. The bottom layer 20 is also relatively less susceptible to interlaminar failure (spalling) resulting from the temperature difference across the depth of the layer because of the strain tolerance provided by the pores 24 and because of the insulating effect of the top layer 22. The top layer 22 is less susceptible to densification and possible interlaminar failure resulting therefrom since it contains a relatively low quantity of pores 24, thus limiting the magnitude of the densification effect. The combination of a less dense bottom layer 20 and a more dense top layer 22 provides desirable properties for a high temperature environment. In other embodiments, the density of the thermal barrier coating may be graduated from a higher density proximate the top of the coating to a lower density proximate the bottom of the coating rather than changed at discrete layers. Herein "internal void fraction" means a fractional volume of pores 24 per volume of a given thermal barrier layer 20, 22, exclusive of the volume of any segmentation grooves 28 in a given layer.

The top layer 22 may be formed of a material with a lower thermal conductivity (low K) than the bottom layer 20. For example, the bottom layer 20 may be formed of yttria-stabilized zirconia, and the top layer 22 may be formed of a different ceramic material with an anisotropic crystal lattice structure, such as found in a monazite, pyrochlore, tungsten bronze, perovskite, or garnet structure. A tungsten bronze structure is described in co-pending application Ser. No. 12/101,460 filed Apr. 11, 2008 by the present assignee. Such a low-K top layer 22 thermally protects the bottom TBC layer 20. The bottom TBC layer 20 provides maximum adherence to the bond coat 16. The grooves 28 may range in depth from at least 50% of an average depth of the top layer 22 up to about 90% of the average total depth of the TBC 18, not including the bond coat 16. A groove depth approximately equal to the depth of the outer TBC layer 22 is an option that helps form a preferred failure plane at the interface between layers 20 and 22. Various depths are shown in FIG. 1.

The dense top layer 22 will have a relatively lower thermal strain tolerance due to its lower pore content. For the very high temperatures of some modern combustion turbine engines, there may be an unacceptable level of interlaminar stress generated in the top layer 22 in its as-deposited condition due to the temperature gradient across the thickness (depth) of that layer. Accordingly, the top layer 22 is segmented to provide additional strain relief in that layer, as illustrated in FIG. 1. A plurality of segments 26 bounded by a plurality of gaps 28 are formed in the top layer 22 by a laser engraving process. The gaps 28 allow the top layer 22 to withstand a large temperature gradient across its thickness without failure, since the expansion/contraction of the material can be at least partially relieved by changes in the gap sizes, which reduces the total stored energy per segment. The gaps 28 may be formed to extend to the full depth of the top layer 22, or to a greater or lesser depth as may be appropriate for a particular application. It may be desired that the gaps do not extend all the way to the bond coat 16 in order to avoid the exposure of the bond coat to the environment of the component 10. The selection of a particular segmentation strategy, including the size and shape of the segments and the depth of the gaps 28, will vary from application to application, but should be selected to result in a level of stress within the thermal barrier coating 18 which is within desired levels at all depths of the TBC for the predetermined temperature environment. Importantly, the use of laser engraved segmentation permits the TBC to be applied to a thickness greater than would otherwise be possible without such segmentation. Current technologies make use of ceramic TBC's with thicknesses of about 12 mils, whereas thicknesses of as much as 50 mils are anticipated with the processes described herein.

Figure 2:
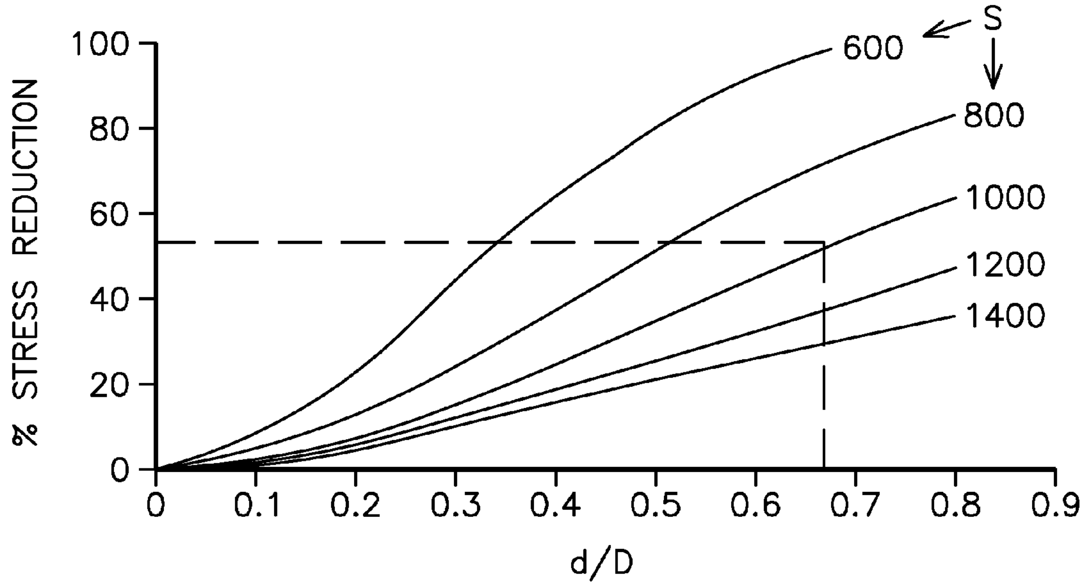
FIG. 2 is a graphical illustration of the reduction in stress on the surface of a thermal barrier coating as a function of the width, depth and spacing of segmentation gaps formed in the surface of the coating.

Known finite element analysis modeling techniques may be used to select an appropriate segmentation strategy. FIG. 2 illustrates the percentage of stress relief versus the ratio of the gap spacing to the gap depth for a typical TBC system using the following values for the properties of the coating and substrate $E_{substrate}$=200 GPa, $E_{TBC}$=40 GPa, gap depth (d)=200 microns, gap centerline spacing (S)=1,000 microns, and coating 18 thickness (D)=300 microns. FIG. 2 illustrates the percentage of stress relief (as a percentage of the stress for a similar component having no segmentation) at a point A on the surface of the TBC coating midway between two gaps as a function of the ratio of gap depth to TBC thickness (d/D) for each of several gap centerline spacing values (S). For example, as can be appreciated by examining the data plotted on FIG. 2, a gap spacing of S=1,000 microns is predicted to produce approximately a 50% reduction in the stress at point A for a gap extending approximately two thirds the depth of the coating. It may be appreciated from FIG. 2 that a smaller spacing S between adjacent gaps will result in a greater reduction in stress. A spacing S between adjacent gaps of less than 500 microns will provide a high degree of stress reduction in the coating. However, there may be practical manufacturing issues that make it difficult to create gaps with very small spacing S. In one embodiment, the a spacing S between adjacent gaps in the range of 500-750 microns may be used, or in the range of 500-1000 microns, or any spacing less than 750 microns or less than 1000 microns. A gap depth d/D of at least 30% of the TBC thickness 18 can provide significant stress reduction, depending on the selected spacing S.

Laser energy is preferred for engraving the gaps 28 after the thermal barrier coating 18 is deposited. The laser energy is directed toward the TBC top surface 30 in order to heat the material in a localized area to a temperature sufficient to cause vaporization and removal of material to a desired depth. The edges of the TBC material bounding the gaps 28 will exhibit a small re-cast surface where material had been heated to just below the temperature necessary for vaporization. The geometry of the walls defining gaps 28 may be controlled by controlling the laser engraving parameters. For turbine airfoil applications, the width of the gap at the surface 30 of the thermal barrier coating 18 may be maintained to be no more than 50 microns, or no more than 25 microns, or less than 125 microns, less than 100 microns, or less than 75 microns. Various embodiments may have a gap width at the surface 30 of between 25-125 microns (i.e. greater than 25 micron and less than 125 micron), between 25-100 microns, between 25-75 micron between 25-50 micron, between 50-100 micron, between 50-75 micron, between 75-125 microns, or between 75-100 microns, for example. Such gap sizes are selected to provide the desired mechanical strain relief while having a minimal impact on aerodynamic efficiency. Wider or more narrow gap widths may be selected for particular portions of a component surface, depending upon the sensitivity of the aerodynamic design and the predicted thermal conditions. The laser engraving process provides flexibility for the component designer in selecting the segmentation strategy most appropriate for any particular area of a component. In higher temperature areas the gap opening width may be made larger than in lower temperature areas. A component may be designed and manufactured to have a different gap width and/or spacing (S) in different sections of the same component.

Figure 3A:
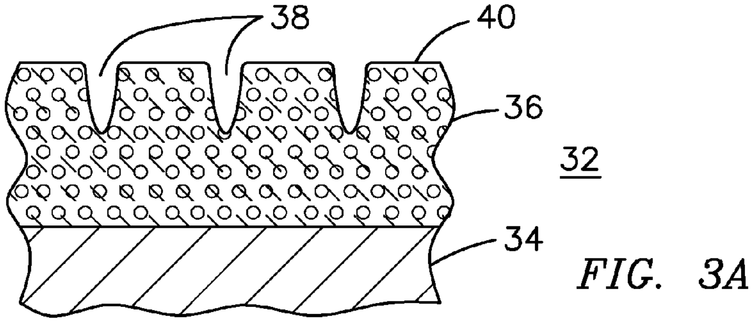
FIG. 3A is a partial cross-section view of a component having a laser-segmented ceramic thermal barrier coating.
Figure 3B:
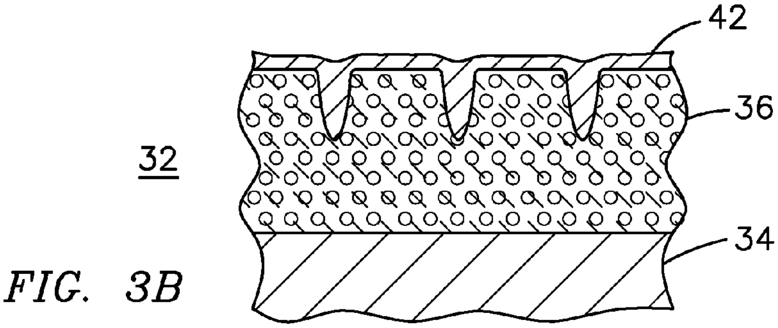
FIG. 3B is the component of FIG. 3A and having a layer of bond inhibiting material deposited thereon.
Figure 3C:
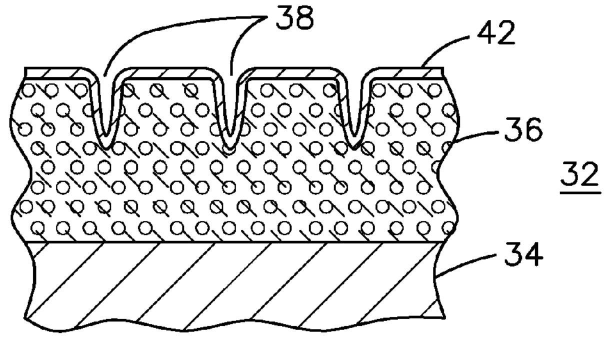
FIG. 3C is the component of FIG. 3B after the bond inhibiting material has been subjected to a heat treatment process.

Furthermore, a bond inhibiting material, such as alumina or yttrium aluminum oxide, may be disposed within the gaps on the gap sidewalls in order to reduce the possibility of the permanent closure of the gaps by sintering during long-term high temperature operation. FIGS. 3A-3C illustrate a partial cross-sectional view of a component part 32 of a combustion turbine engine during sequential stages of fabrication. A substrate material 34 is coated with a variable density ceramic thermal barrier coating 36 as described above. For example, the varying density of layer 36 may be achieved by varying the proportion of a fugitive material in the layer 36 during application to vary the void fraction by depth. Layer 36 may also be varied in elemental composition by depth, such that higher levels have a lower thermal conductivity for a given density than lower levels. This achieves benefits described for FIGS. 1 and 2, without a distinct interface between layers 20 and 22. A plurality of gaps 38, as shown in FIG. 3A, are formed by laser engraving the surface 40 of the ceramic material. Other methods and other forms of energy may be used to form the gaps, for example, ion beam, electron beam, EDM, abrasive machining, chemical etching, etc. A layer of a bond inhibiting material 42 is deposited on the surface 40 of the ceramic, including into the gaps 38, by any known deposition technique, such as sol gel, CVD, PVD, etc. as shown in FIG. 3B. The amorphous state as-deposited bond inhibiting material 42 is then subjected to a heat treatment process as is known in the art to convert it to a crystalline structure, thereby reducing its volume and resulting in the structure of FIG. 3C. The presence of the bond inhibiting material 42 within the gaps 38 provides improved protection against the sintering of the material and a resulting closure of the gaps 38.

The inventors have found that a YAG laser may be used for engraving the gaps of the subject invention. A YAG laser has a wavelength of about 1.6 microns and will therefore serve as a finer cutting instrument than would a carbon dioxide laser that has a wavelength of about 10.1 microns. A power level of about 20-200 watts and a beam travel speed of between 5-600 mm/sec have been found to be useful for cutting a typical ceramic thermal barrier coating material. The laser energy is focused on the surface of the coating material using a lens having a focal distance of about 25-240 mm. In one embodiment, a lens having a focal distance of 56 mm was used. In order to reduce the accumulation of molten material splashed onto the lens during the laser engraving process, a lens having a focal distance of at least 160 mm may be used. Typically 2-12 passes across the surface may be used to form the desired depth of continuous gap.

Figure 4A:
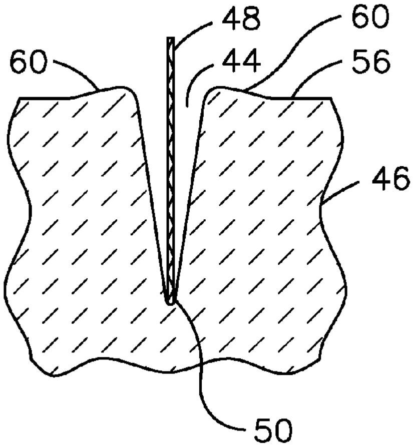
FIG. 4A is a cross-section view of a gap being cut into a ceramic material by a first pass of a laser having a first focal distance, the gap having a generally V-shaped bottom geometry.
Figure 4B:
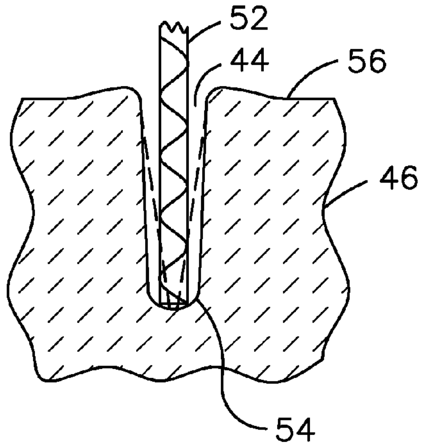
FIG. 4B is the gap of FIG. 4A being subjected to a second pass of laser energy having a focal distance greater than that used in the first pass of FIG. 4A to change the gap bottom geometry to a generally U-shape.

It may be beneficial to change one or more parameters of the energy used to create the gap between sequential applications of energy to the insulation material. The geometry of the gap thus formed may be affected by such a change in energy parameter(s). The inventors have found that a generally U-shaped bottom geometry may be formed in the gap by making a second pass with the laser over an existing laser-cut gap, wherein the second pass is made with a wider beam footprint than was used for the first pass in order to reshape the walls defining the gap. The wider beam footprint may be accomplished by simply moving the laser farther away from the ceramic surface or by using a lens with a longer focal distance. In this manner the energy from the second pass exposure will tend to penetrate less deeply into the ceramic but will heat and evaporate a wider swath of material near the bottom of the gap, thus forming a generally U-shaped bottom geometry rather than a generally V-shaped bottom geometry as may be formed with a first pass. This process is illustrated in FIGS. 4A and 4B. A gap 44 is formed in a layer of ceramic material 46. In FIG. 4A, a first pass of the laser energy 48 having a first focal distance and a first footprint size is used to cut the gap 44. Gap 44 after this pass of laser energy has a generally V-shaped bottom geometry 50. In FIG. 4B, a second pass of laser energy 52 having a second focal distance greater than the first focal distance and a second footprint size greater than the first footprint size is used to widen the bottom of gap 44 into a generally U-shaped bottom geometry 54. The dashed line in FIG. 4B denotes the gap shape from FIG. 4A, and it can be seen that the wider laser beam tends to evaporate material from along the walls of the gap 44 without significantly deepening the gap, thereby giving it a less sharp bottom geometry. The width of the gap 44 at the top surface 56 in FIG. 4A is wider than the width of the beam of laser energy 48 due to the natural convection of heat from the bottom to the top as the gap 44 is formed. Therefore, the width of beam 52 can be made appreciably wider than that of beam 48 without impinging onto the sides of the gap 44 near the top surface 56. Since the energy density of beam 52 is less than that of beam 48, the effect of beam 52 will be to remove more material from the sides of the gap 44 than from the bottom of the gap, thus rounding the bottom geometry somewhat. Such a U-shaped bottom geometry will result in a lower stress concentration at the bottom of the gap 44 than would a generally V-shaped geometry of the same depth.

The bottom geometry of the gap 44 may also be affected by the rate of pulsation of the laser beam 52. It is known that laser energy may be delivered as a continuous beam or as a pulsed beam. The rate of the pulsations may be any desired frequency, for example from 1-20 kHz. Note that this frequency should not be confused with the frequency of the laser light itself. For a given power level, a slower frequency of pulsations will tend to cut deeper into the ceramic material 46 than would the same amount of energy delivered with a faster frequency of pulsations. Accordingly, the rate of pulsations is a variable that may be controlled to affect the shape of the bottom geometry of the gap 44. In one embodiment, the inventors envision a first pass of the laser energy 48 having a first frequency of pulsations being used to cut the gap 44. Gap 44 after this pass of laser energy may have a generally V-shaped bottom geometry 50. A second pass of laser energy 52 having a second frequency of pulsations greater than the first frequency of pulsations is used to widen the bottom of gap 44 into a generally U-shaped bottom geometry 54. The dashed line in FIG. 4B denotes the gap shape from FIG. 4A, and it is expected that the more rapidly pulsed laser beam would tend to evaporate material from along the walls of the gap 44 without a corresponding deepening of the gap, thereby giving the gap a less sharp bottom geometry. The bottom geometry 54 may further be controlled by controlling a combination of laser beam footprint and pulsation frequency, as well as other cutting parameters. If energy other than laser energy is used to form the gap, similar or other changes in energy parameter(s) may be used to provide a desired gap geometry. Furthermore, the insulating material may be exposed to more than one form of energy, e.g. laser energy then ion beam or other combinations of forms of energy, to achieve a desired geometry. Alternatively, combinations of methods may be used to form a single gap, e.g., a chemical etch and the application of a form of electromagnetic energy.

The laser energy may be delivered to the ceramic material 46 through a fiber optic cable. A fiber optic cable may be particularly useful in applications where access to the ceramic material surface 56 is limited. One or more lens could be used downstream and/or upstream of the fiber optic cable to enhance the power density and/or the focus of the energy.

Figure 5:
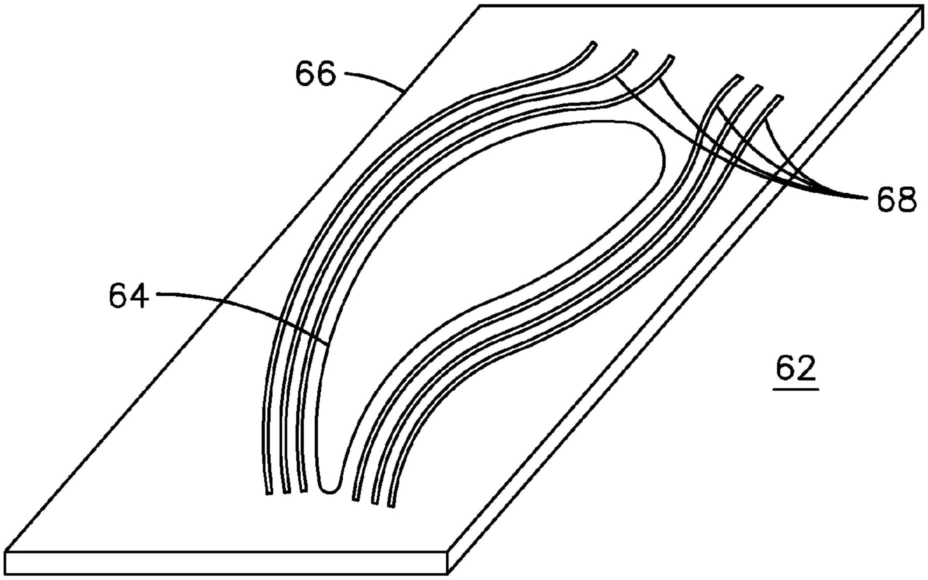
FIG. 5 is a plane view of a gas turbine vane illustrating segments formed in a thermal barrier coating by laser engraved grooves extending along the path of a fluid stream traveling around the vane.

When gap 44 is formed in the ceramic material 46 by a laser engraving process or other heat-inducing process, a portion of the molten material generated by the laser energy is splashed onto the top surface 56 of the ceramic material proximate the gap 44 to form a ridge 60 on opposed sides of the gap 44. The ridge 60 may have a height above the original plane of the top surface 56 of about 10-50 microns for example. Ridge 60 would cause a perturbation and downstream wake in an airflow passing over the ceramic thermal barrier coating material 46. Accordingly, in prior art laser drilling operations where laser energy has been used to drill cooling fluid passages through a ceramic coating, such ridges 60 have been removed, such as by polishing, prior to use of the component in an airfoil application such as a gas turbine blade. The present inventors have realized that laser engraved gap 44 may be used in an air stream application in its as-formed state including ridge 60 provided that the axis of the gap 44 (i.e. its longitudinal length along the gap perpendicular to the paper as viewed in FIGS. 4A and 4B) is oriented along the direction of flow of the air/fluid passing over the ceramic material 46. This concept is illustrated in FIG. 5 where a gas turbine stationary vane assembly 62 is seen in a top plan view showing an airfoil member 64 attached to a platform 66. The platform 66 is coated with a ceramic thermal barrier coating into which a plurality of continuous laser engraved grooves or gaps 68 are formed. The grooves 68 are formed on the platform 66 in a pattern that coincides with the direction of a fluid stream flowing over the platform 66. Because the fluid is flowing parallel to a longitudinal axis of the groove 68, the fluid dynamic impact of the ridge 60 (illustrated in FIGS. 4A and 4B but not in FIG. 5) adjacent the groove 68 is minimal. Furthermore, the fluid stream will tend to sweep along the groove 68, thereby helping to keep the groove 68 free of debris that might otherwise possibly accumulate in a cross-flow environment. Continuous laser engraved grooves may also be formed on the airfoil member 64 in a direction corresponding to the direction of the fluid stream over the airfoil, i.e. from the leading edge toward the trailing edge. In one embodiment, such grooves are formed proximate the leading edge only, i.e. along the highest temperature regions of the airfoil member 64. Similarly, the fillet area between the airfoil member 64 and the platform 66 may be grooved in a direction parallel to the air flow in a direction from the leading edge to the trailing edge of the airfoil member 64. These embodiments are provided by way of illustration and are not meant to limit the present invention, which may include grooves with or without ridges 60, and grooves parallel to, perpendicular to and/or otherwise oblique to a direction of a fluid stream.

Figure 6:
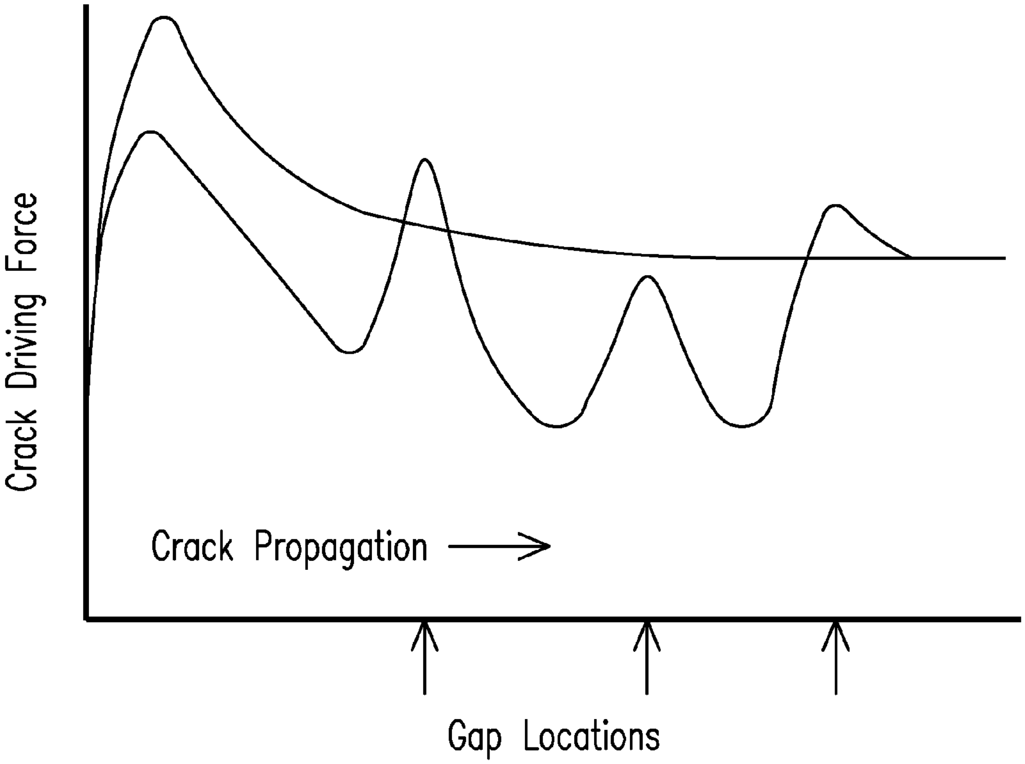
FIG. 6 is a graph illustrating the impact of surface gaps on the force needed to extend a crack between a thermal barrier coating and an underlying bond coat.

The laser engraved gaps 44 can be formed to have a shape that is generally perpendicular to the top surface 56 of the ceramic material 46; i.e. a depth dimension line drawn from the center of the top of the gap to the center of the bottom of the gap would be perpendicular to the plane of the surface 56. This may be accomplished by keeping the laser beam 52 perpendicular to the surface 56 as it is moved in any direction. Alternatively, if the laser beam 52 is disposed at an oblique angle to the surface 56, the beam 52 can be moved parallel to the direction of the oblique angle along the laser line of sight so that the resulting gap 44 still remains perpendicular to the surface 56. The depth of the gap 44 may be less than 100% of the depth of the coating to avoid penetrating an underlying bond coat, and it may be at least 50% of the thickness of the ceramic coating, or between 50-67% of the depth of the coating. Such partial depth gaps 44 not only relieve stress in the coating, but they also serve as crack terminators for a crack developing between the bond coat and the ceramic thermal barrier coating. This aspect is illustrated in FIG. 6, which shows the level of stress needed to drive a crack along the interface between a bond coat and an overlying thermal barrier coating. As illustrated in FIG. 6, the crack driving force decreases in the region between the laser engraved gaps in the surface, thus reducing the crack propagation velocity and consequently increasing the coating spallation life when compared to a non-engraved coating. FIG. 6 was developed using a finite element model assuming no transient temperature dependence and depicting the stresses upon cooling under stationary conditions.

One embodiment of the present invention utilizes a Model RS100D YAG laser producing a pulsed laser light with a repetition rate of 20 KHz with a power of 15 watts delivered with a 110 nanosecond pulse duration and 4.9 mJ/pulse. Two to six passes of laser energy are made over the surface of a ceramic thermal barrier coating through a 160 mm lens at a distance above the surface of approximately 150-175 mm to produce a 75-100 micron wide groove extending 50-67% of the coating depth. Additional parallel grooves may be produced by repeating this process at a spacing of 500 microns away from the first groove.

Figure 7:
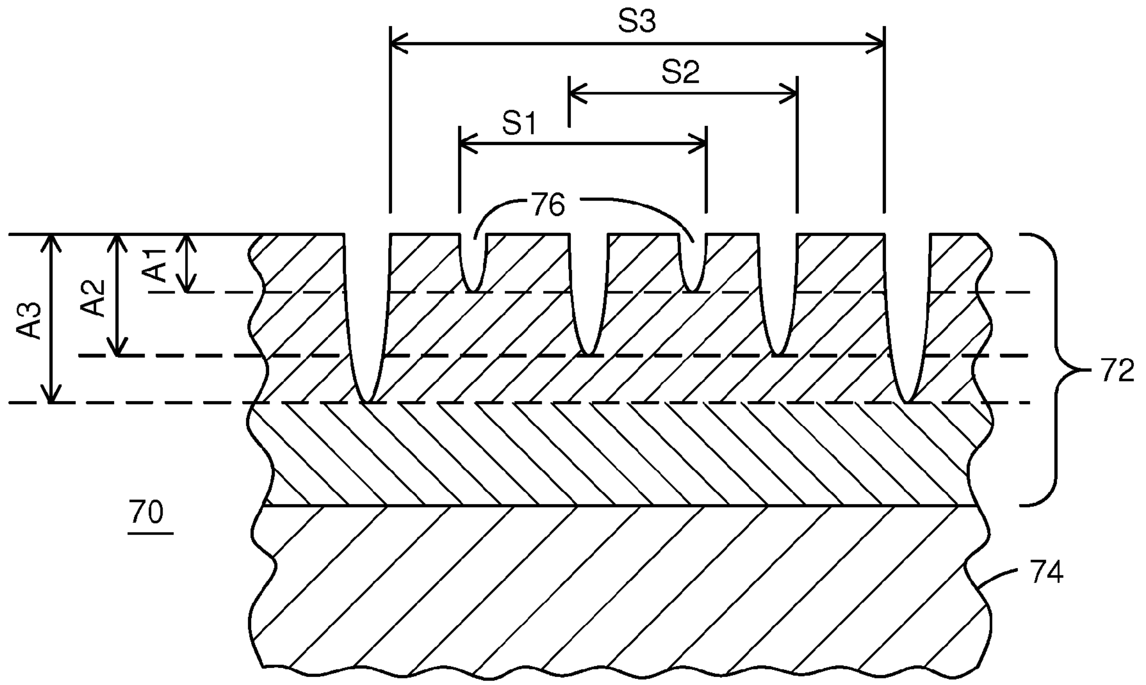
FIG. 7 is a partial cross-sectional view of an insulated component having a ceramic thermal barrier coating that is segmented by a plurality of laser-engraved grooves formed to a plurality of predetermined depths to define preferred failure planes throughout the depth of the coating.

FIG. 7 illustrates a partial cross-sectional view of an insulated component 70 having a ceramic thermal barrier coating 72 covering a substrate material 74. In one embodiment, the TBC 72 in this figure can correspond to the TBC 18 of FIG. 1. Thus, TBC 72 may have multiple layers 20, 22, illustrated by different hatching directions. For example, the dashed depth line A3 may correspond to a top surface of a first layer 22 of FIG. 1. In another embodiment, the TBC 72 of FIG. 7 can correspond to the gradient layer 36 of FIG. 3A, and have a gradient of materials and/or void fraction as previously described. A laser-engraving process is used to form continuous grooves 76 extending to a partial depth into the coating 72 from the top surface 78. Various ones of the grooves 76 are formed to extend to selected predetermined depths A1, A2 and A3 below the top surface 78 to form a multi-layered arrangement of vertical segmentation within the coating 72. This arrangement is selected to allow the coating to spall within discreet planes of failure as a result of service-induced thermal stresses. By tailoring the depths of the grooves 76 and the spacing S1, S2, S3 between grooves of the same depth, spallation can be forced to occur at optimum levels, thereby resulting in a fresh, un-sintered coating surface being exposed when an upper layer of the coating 72 spalls off. In this manner, the operating life of the coating 72 may be increased beyond that of a similar coating formed with no grooves or with grooves all having a uniform depth. The groove depths and spacing may be selected so that the stress induced in the coating 72 during a known thermal gradient will reach a critical level at a critical depth within the coating 72, such as at depth A1. Once the critical stress level is achieved, the coating will fail in a generally planar manner at the critical depth, thereby exposing a new surface of the coating 72. For example, a first subset of the grooves may have a substantially uniform depth A1 of about 20-30% of the average thickness of the TBC, a second subset of the grooves may have a second substantially uniform depth A2 of about twice A1, and a third subset of the grooves may have a substantially uniform depth A3 of about three times A1. The subsets of grooves may alternate with each other in the groove pattern across the TBC as shown to define respective preferred failure planes at depths A1, A2, A3 in the TBC.

Figure 10:
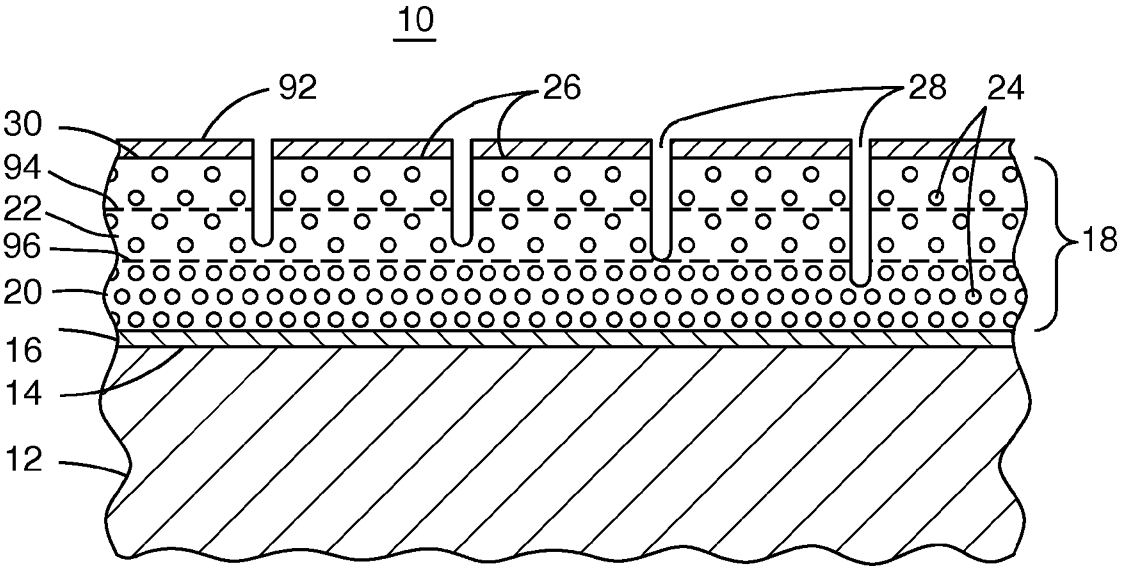
FIG. 10 is a partial cross-sectional view as in FIG. 9 with seed layers providing preferred failure planes, including a failure plane at an interface between two TBC layers.

It is also possible to utilize a "seed" material at the critical depth to change the interface properties between layers and to ensure that failure propagation remains at the interface of the layers. For a zirconia coating, the seed material may be organic, including carbon, graphite, or polymer for example, or it may be inorganic, including alumina, hafnia or other high temperature oxide material having a thermal expansion characteristic or geometric or other property different than the zirconia to enhance crack propagation within the failure plane. FIG. 10 illustrates such seed layers 94, 96 as dashed lines. If one or more seed layers are used, a seed layer 96 may be located at the interface between TBC layers 20 and 22.

Figure 8:
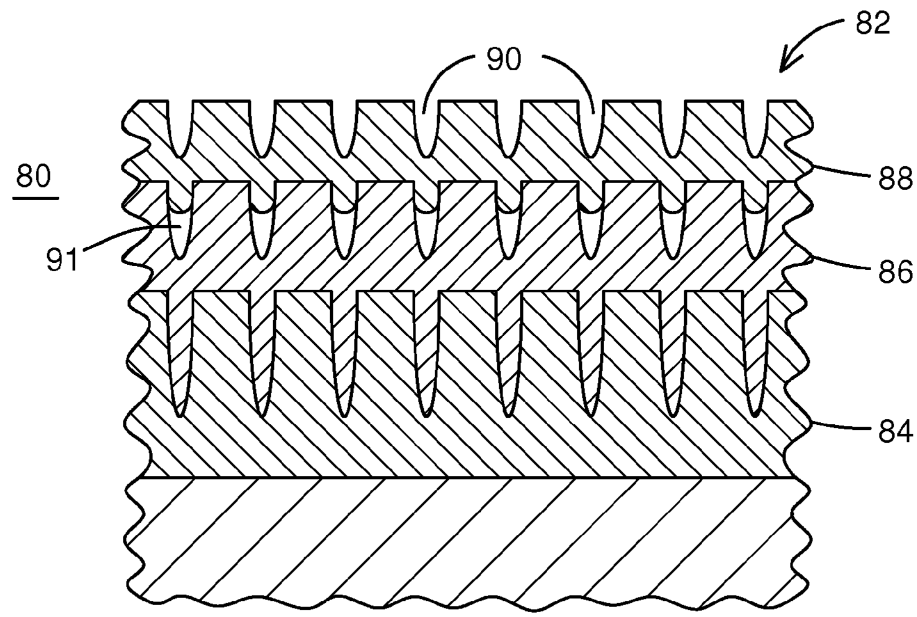
FIG. 8 is a partial cross-sectional view of an insulated component having a ceramic thermal barrier coating that is formed by a plurality of layers, with each layer segmented by a plurality of laser-engraved grooves, thereby defining preferred failure planes throughout the depth of the coating.

FIG. 8 illustrates another embodiment of an insulated component 80 having a layer of ceramic thermal insulation 82 that is formed to have three distinct segmented layers 84, 86, 88. Each layer 84, 86, 88 is laser engraved after it is deposited and before it is covered by a subsequent layer to include a plurality of stress-relieving grooves 90. The vertically stacked grooves optionally may be aligned with each other. The underlying grooves may be partially filled 91 but not fully filled-in by the overlying coating layer. In this embodiment, the thermal insulation 82 will preferentially fail along the interface between the respective layers 84, 86, 88. The depth of the layers and the segmentation scheme are selected to allow the insulation 82 to spall along a critical depth in response to an expected thermal transient, thereby presenting a fresh layer of the insulation to the exterior environment. The properties of the material, the thermal gradient across the insulation, and the distance between vertical segments are contributing factors that define the strain energy buildup and subsequent spallation depth in such a coating. A coating may thus be designed to have a plurality of layers of defined spallation thicknesses, each providing a duration of exposure to the surrounding high temperature environment. The total useful life of the coating is the sum of the times leading to the spallation of the various layers, and such time may well exceed the total spallation life of an un-segmented coating. In one embodiment, layer 84 of FIG. 8 corresponds to layer 20 of FIG. 1, and may be segmented as shown, or may not be segmented. In another embodiment, layer 84 can be a variable density/material layer 36 as in FIG. 3A.

Figure 9:
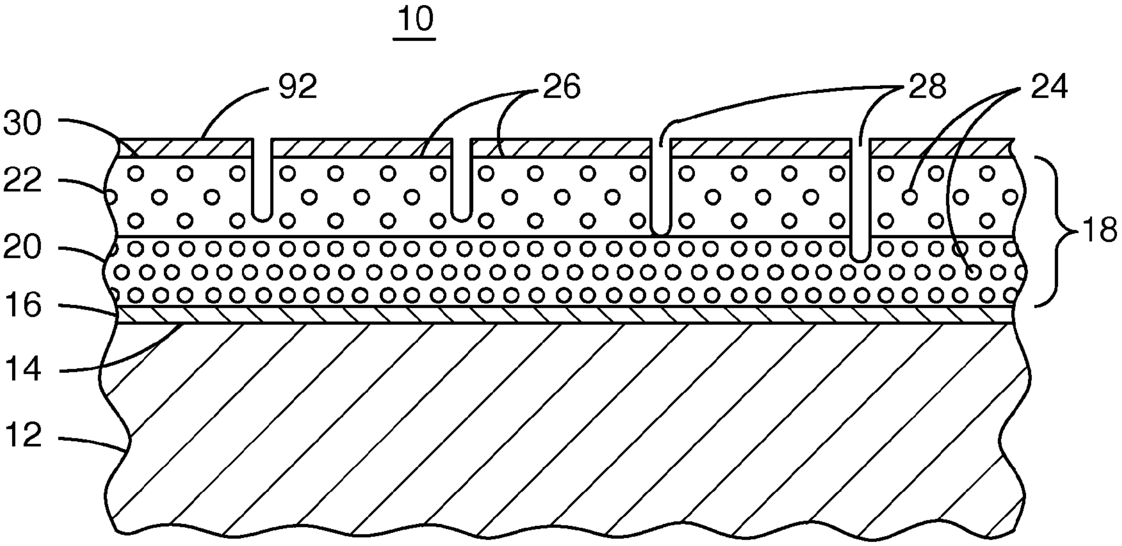
FIG. 9 is a partial cross-sectional view as in FIG. 1 with an additional functional layer for environmental sealing and/or erosion resistance.

FIG. 9 shows a partial cross-sectional view as in FIG. 1 with an additional functional layer 92 for environmental sealing and/or resistance to erosion from chemicals and particles in the working gas of the turbine. In one embodiment, this layer 92 may be formed of a material that is denser than the top layer 22, 88. In spite of the density of this topmost functional layer 92, the gaps 28 provide adequate strain relief so that the coating 92 remains adhered to the underlying material even during temperature transient events. The functional layer 92 may be less than 100 microns in thickness, thereby providing the functional benefit while further limiting differential expansion stresses. Functional layer 92 may be, as examples: $Yb_2Si_2O_7$ or $Lu_2Si_2O_7$ or $Y_2SiO_5$ or $HfSiO_4$ or $GdHf_2O_7$ or $Yb_2Hf_2O_7$ or any hafnia based pyrochlore for water vapor/steam resistance; or $ZrO_2$—$Y_2O_3$—$TiO_2$ or $ZrO_2$—$Gd_2O_3$—$TiO_2$ for its anti-stick properties for environmental sealing, particularly for molten ash particles containing calcium-magnesium-aluminum-silicon (CMAS) oxide systems; or $Al_2O_3$ or $Al_2O_3$-13 wt % $TiO_2$ or $Y_3Al_5O_{12}$ or $MgAl_2O_4$ for erosion resistance.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A thermal barrier coating (TBC) on a substrate, comprising:
- a substrate;
- a first layer of a first ceramic material on a surface of the substrate;
- a second layer of a second ceramic material on the first layer;
- the first layer comprising a distribution of internal pores that provides a lower density of the first layer compared to the second layer;
- the TBC comprising a pattern of engraved grooves in a surface distal to the substrate that defines a segmentation of the TBC.

2. The thermal barrier coating of claim 1, wherein a first subset of the grooves has a substantially uniform first depth, a second subset of the grooves has a substantially uniform second depth, and the first and second subsets of grooves alternate with each other in the groove pattern across the TBC to define respective first and second preferred failure planes at the first and second depths in the TBC.

3. The thermal barrier coating of claim 2, wherein the first depth is located at a critical thermal gradient stress plane in the TBC, and the second depth is about twice the first depth.

4. The thermal barrier coating of claim 1, wherein a first subset of the grooves has a substantially uniform first depth A1 of about 20-30% of the average thickness of the TBC, a second subset of the grooves has a substantially uniform second depth A2 of about twice A1, a third subset of the grooves has a substantially uniform third depth A3 of about three times A1, and the subsets of the grooves alternate with each other in the groove pattern across the TBC to define respective preferred failure planes at depths A1, A2, A3 in the TBC.

5. The thermal barrier coating of claim 1, wherein at least some of the grooves in the TBC have an average depth of at least half of a thickness of the second layer.

6. The thermal barrier coating of claim 1, wherein the first and second layers comprise respective first and second patterns of engraved grooves in respective first and second layer surfaces distal to the substrate, wherein each pattern of grooves defines a segmentation of the respective first and second layers, and at least some of the grooves in each of the first and second layers have an average depth of at least half of an average thickness of the respective first and second layers.

7. A thermal barrier coating (TBC) on a substrate, comprising:
- a substrate;
- a first layer of a first ceramic material on a surface of the substrate;
- a second layer of a second ceramic material on the first layer;
- the first layer comprising a distribution of internal pores that provides an internal void fraction in the first layer greater than an internal void fraction in the second layer;
- the TBC comprising a pattern of engraved grooves in a surface distal to the substrate that define a segmentation of the TBC;
- wherein the grooves have an average depth of at least 30% of an average total depth of the combined first and second layers and at least 50% of an average depth of the second layer.

8. The thermal barrier coating of claim 7, wherein at least some of the grooves have a depth substantially equal to a depth of the second layer.

9. The thermal barrier coating of claim 7, wherein the first and second layers comprise respective first and second sets of engraved grooves.

* * * * *